United States Patent [19]

Gonzalez-Lopez et al.

[11] Patent Number: 5,043,921
[45] Date of Patent: Aug. 27, 1991

[54] HIGH SPEED Z-BUFFER CONTROL

[75] Inventors: Jorge Gonzalez-Lopez, Red Hook; Thomas P. Lanzoni, Lake Katrine, both of N.Y.

[73] Assignee: International Business Machines Corporation, Armonk, N.Y.

[21] Appl. No.: 425,778

[22] Filed: Oct. 23, 1989

[51] Int. Cl.5 .............................................. G06F 15/72
[52] U.S. Cl. ................................................... 364/522
[58] Field of Search ................. 364/522, 521; 340/729

[56] References Cited
U.S. PATENT DOCUMENTS

| 4,658,247 | 4/1987 | Gharachorloo | 364/521 X |
| 4,679,041 | 7/1987 | Fetter et al. | 340/729 X |
| 4,812,988 | 3/1989 | Duthuit et al. | 364/522 |
| 4,945,500 | 7/1990 | Deering | 364/522 |
| 4,951,232 | 8/1990 | Hannah | 364/522 |

Primary Examiner—David L. Clark
Assistant Examiner—Mark K. Zimmerman
Attorney, Agent, or Firm—William A. Kinnaman, Jr.; Mark S. Walker

[57] ABSTRACT

Z-buffer control logic that provides access AND comparison at speeds unconstrained by DRAM memory access times. A Z-buffer controller is implemented which accumulates a number of pixels in adjacent locations into an associated cell. A Z-buffer comparator accesses Z-buffer retained values for the cell in parallel, performs parallel comparisons, and passes the results to a serializer. The Z-buffer serializer returns the order of the written pixels and outputs the required values to a display interface for continued processing and display on a graphics display device.

4 Claims, 4 Drawing Sheets

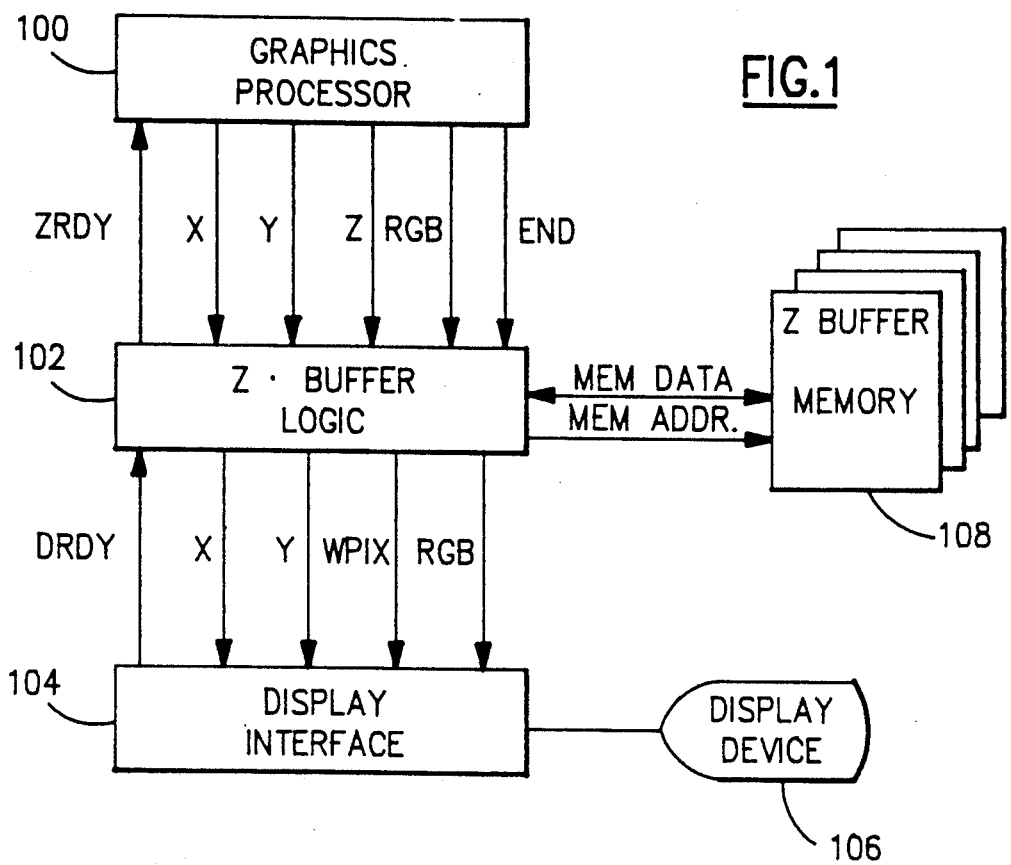
FIG.1
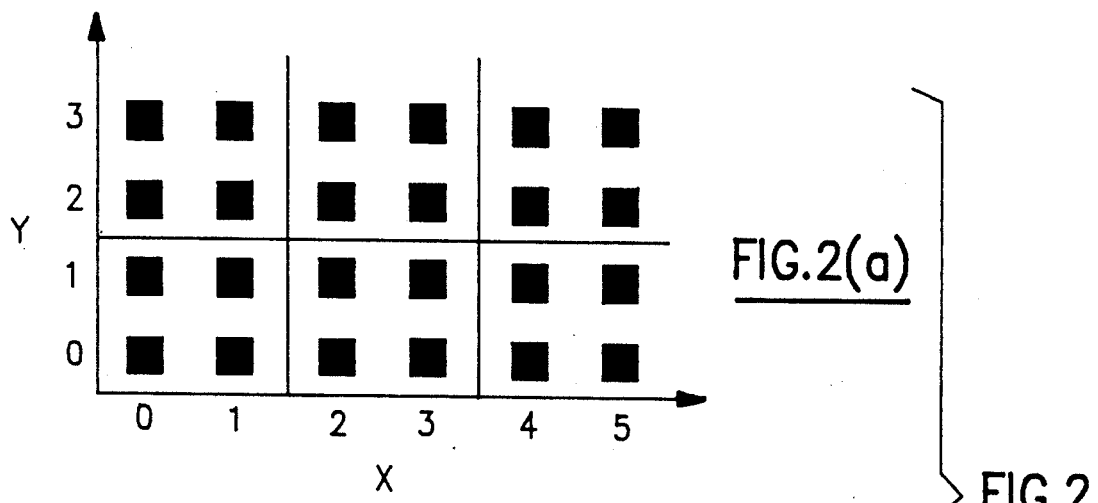
FIG.2(a)
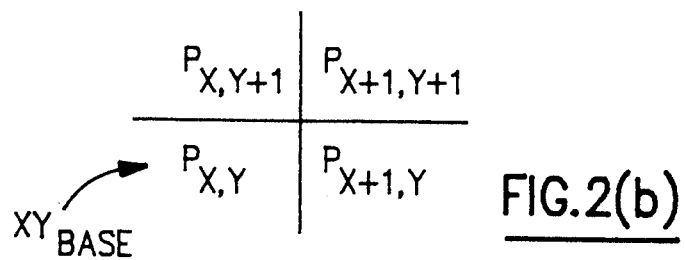
FIG.2(b)
FIG.2

REGISTERS $P_{i,j}$ FORMAT :

REGISTERS $Q_{i,j}$ FORMAT :

REGISTERS $R_{i,j}$ FORMAT :

HIGH SPEED Z-BUFFER CONTROL

BACKGROUND OF THE INVENTION

1. Field of the Invention

The present invention relates to methods and apparatus for displaying three dimensional graphics objects and more particularly to data processing apparatus and methods for generating and manipulating three dimensional objects on a graphics display system.

2. Description of Related Art

Computer graphics systems are frequently used to model three dimensional objects and then display them on a two dimensional output device such as a cathode ray tube. Displaying three dimensional objects on a two dimensional display device requires the system to recognize and eliminate hidden surfaces and lines to obtain the desired three dimensional affect. One method for eliminating hidden surfaces of the image involves the use of a depth buffer or Z-buffer. The Z-buffer is a large array of memory with an entry for each picture element, or pixel, on the display device.

The Z axis in a graphics system reflects the distance from a specified observer's viewpoint. Thus, a larger Z value represents a greater distance from the viewpoint. A comparison of Z values of points on the generated objects determines which object is closest to the viewpoint and therefore should appear on the two dimensional display. In Z-buffer systems as each pixel is generated its Z coordinate (ZNEW) is compared with the Z coordinate previously stored in the Z-buffer (ZOLD). If ZOLD does not exist, then ZNEW is compared to the Z coordinate of the background. If ZNEW is less than ZOLD (indicating that this pixel is closer to the viewpoint than the previous viewpoint), then the pixel is written to the display device and the Z-buffer memory is updated to contain ZNEW. If ZNEW is greater than or equal to ZOLD, then the pixel is not written and the Z-buffer remains unchanged. A description of the Z-buffer technique is presented in the book *Fundamentals of Interactive Computer Graphics* by J. D. Foley and A. Van Dam, Addison-Wesley Publishing Co., 1982, pp. 560–561.

The use of a Z-buffer simplifies the solution of the hidden surface problem, however the speed at which the Z-buffer memory can be read, compared, and updated limits the graphic system pixel writing speed. The large amount of memory required, typically 1 megabyte or more, and the cost of these devices dictates the use of dynamic random access memory (DRAM) instead of more costly static random access memory (SRAM). Commercially available DRAMs have typical read-modify-write (RMW) cycle times of approximately 200 nanoseconds (ns).

The typical computer graphics processor is capable of generating pixel data at high speed, typically 100 ns per pixel, and a display device is typically capable for receiving pixel data at equally high speeds. Therefore the slow RMW cycle time of the DRAM is a limiting factor in the ability to speed the display generation process.

One effort to overcome the speed limitation is found in U.S. Pat. No. 4,679,041, "High Speed Z-Buffer With Dynamic Random Access Memory" to Fetter et al. Fetter et al. recognize the limitation of slow DRAM cycle times and implement a system that overlaps the ZNEW calculation with the ZOLD read-modify-write cycle. The Fetter et al. solution, however, is still limited in its ability to reduce the Z-buffer cycle times. Modern graphics processing systems require even faster Z-buffer processing

SUMMARY OF THE INVENTION

It is therefore an object of the present invention to provide a Z-buffer system in which DRAMs with a relatively slow cycle time can be employed without degrading the pixel writing time of the faster graphics processing system. It is a further object of the present invention to provide a Z-buffer controller that is capable of performing Z-buffer comparisons at the rate of graphics system pixel generation using DRAMs whose pixel read-modify-write cycle time is greater than the pixel generation cycle time.

These and other objects of the invention will be met in the apparatus and method disclosed below which provide a Z-buffer controller that provide rapid comparison of values by comparing blocks of Z values at each cycle.

BRIEF DESCRIPTION OF THE DRAWING

FIG. 1 is a block diagram illustrating the overall structure of a graphics system according to the present invention.

FIG. 2(a) is an illustration of a pixel cell arrangement according to the present invention.

FIG. 2(b) illustrates the pixel relative addressing scheme employed in the preferred embodiment of the present invention.

DETAILED DESCRIPTION OF THE PREFERRED EMBODIMENT

Figure 3:
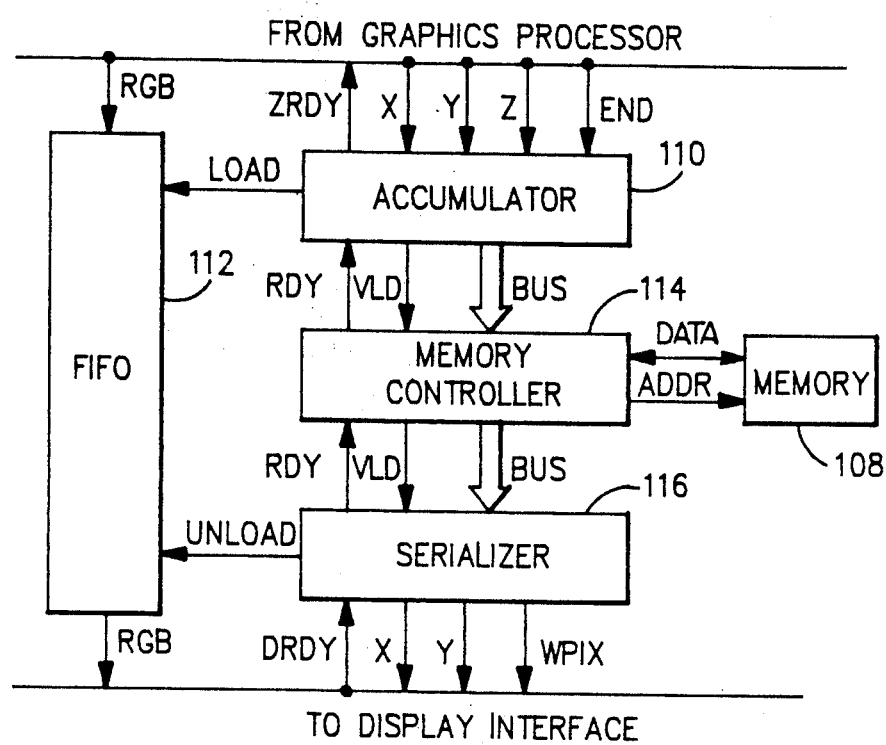
FIG. 3 is a block diagram of the Z-buffer control logic according to the present invention.

A graphics system employing the present invention is shown schematically in FIG. 1. The graphics processor 100 generates the X, Y, and Z coordinates for each pixel of an object to be rendered. Three axis coordinates and a color, usually specified by red, green, and blue components (RGB) are generated for each pixel as required to describe the object. The graphics processor may start at any X, Y, Z coordinate location and generate a sequence of adjacent pixels proceeding in the horizontal, vertical or diagonal directions. In the preferred embodiment, the processors generates an "END" signal when no more pixel data is to follow. A signal "ZRDY" is generated by the Z-buffer controller 102 to indicate the Z-buffer is ready to accept pixel data.

The display interface 104 accepts pixel data in the form of two-dimensional coordinates (X, Y) and color (R, G, B). A signal "WPIX" indicates whether or not the pixel should be written on the display device. Only those pixels that are visible have an active WPIX value. The signal "DRDY" indicates the display interface is ready to receive pixel data. The display interface operates to generate the signals necessary to display the graphic image on display device 106. Although a CRT or monitor device is shown in the preferred embodiment, the techniques employed herein work equally well for any two dimensional display device such as a plotter, printer, or other monitor type.

Z-buffer control logic 102 controls the evaluation of each Z coordinate to eliminate surfaces or lines which are hidden behind other surfaces. The Z-buffer is provided with Z-buffer memory 108 in which each pixel on the display device has a corresponding entry. The buffer memory 108, in the preferred embodiment, consists of multiple dynamic random access memory (DRAM) modules that can be accessed simultaneously in a single memory access cycle. The Z-buffer is organized so that adjacent pixels are located in different DRAM modules.

The Z-buffer controller according to the present invention accumulates the pixel data from the graphics processor for adjacent pixels and then performs Z-buffer comparison in parallel for the collected pixels. All pixels whose ZNEW is less than ZOLD are updated in parallel and the corresponding X, Y, and color data sent to the display interface. Otherwise, that pixel data is discarded. By accumulating pixels with related Z-buffer memory addresses and processing them in parallel, the time penalty paid for accessing, comparing, and updating the Z-buffer memory is distributed over multiple pixels. Once the comparison has been made, the pixel data is reserialized for display by the display interface.

The number of DRAM modules or independent address paths required to implement the present invention is determined by the relative speeds of DRAM access and pixel generation from the graphics processor. The number of pixels compared in a single operation, $n_p$, is related to the pixel generation rate of the graphics processor, $f_p$, as follows:

$$(t_a + t_c + t_u)/n_p \leftarrow 1/f_p$$

where:
$t_a$ = memory access time
$t_c$ = compare time
$t_u$ = memory update time Thus, in the preferred embodiment which has DRAM access, compare and update time of 200 nanoseconds and a pixel generation rate of 0.01 pixels per nanosecond (100 nanoseconds per pixel) the number of pixels to be compared must be at least two.

The invention relates to simultaneously processing an $m \times n$ cell of pixels. In the preferred embodiment, four pixels can be simultaneously compared. As shown in FIG. 2(a), the cells are $2 \times 2$, spanning two pixels horizontally and two pixels vertically This grouping of four pixels is selected because a particular line generation may result in two horizontal, two vertical, or two diagonal pixels being generated for testing against the Z-buffer. By selecting a $2 \times 2$ cell, the system has a high probability of having two or more pixels to access at each cycle. The pixels are addressed relative to a base pixel, $XY_{base}$.

The controller is arranged to perform a comparison whenever the end of pixel data is reached or line generation causes a crossing of a cell boundary.

In the preferred embodiment, simultaneous Z-buffer access for adjacent pixels is provided by having four DRAM modules addressable by a single address. Various other DRAM arrangements are possible as long as multiple pixel addresses can be accessed during a single processing cycle. The present invention reduces the number of address lines required by specifying a single address for accessing the four DRAMs.

Z-buffer control logic 102 is shown in greater detail in FIG. 3. Accumulator 110 performs the function of collecting pixels generated by the graphics processor into cells. The accumulator tags each pixel data point with the order in which it arrived at the accumulator. The order is used to reserialize the pixels after the Z-buffer comparison. Finally, the accumulator detects the crossing of a cell boundary or the end of pixel data. Because the RGB components are unnecessary to the Z-buffer comparison, the controller according to the preferred embodiment of the present invention loads the RGB values into a first-in first-out (FIFO) queue 112 for later reference. These values could be carried with the pixels passed by the accumulator if desired.

The accumulator passes the accumulated cell of pixels to memory controller 114. The memory controller 114 accesses memory 108, performs the comparison and, for all those pixels for which ZNEW<ZOLD, writes ZNEW to memory and tags the pixels as being visible. All other pixels are tagged as invisible (i.e. those pixels with ZNEW≧ZOLD, those beyond a previously written pixel).

Controller 114 passes the results from controller 114 to serializer 116 that generates single pixels and transmits each pixel value to the display interface. If the pixel has been tagged as visible, then the WPIX value is active and the FIFO queue is unloaded into the display interface. Otherwise WPIX is inactive and the FIFO is unloaded and discarded.

It is necessary in the preferred embodiment to tag each pixel in the cell with its order of generation because the Z coordinate stored for comparison is arranged only by position in the cell. The cell ordering is not guaranteed to be the same as the the pixels were generated by the graphics processor. The order tag is used by the control logic to reserialize pixels in the order generated.

Figure 4:
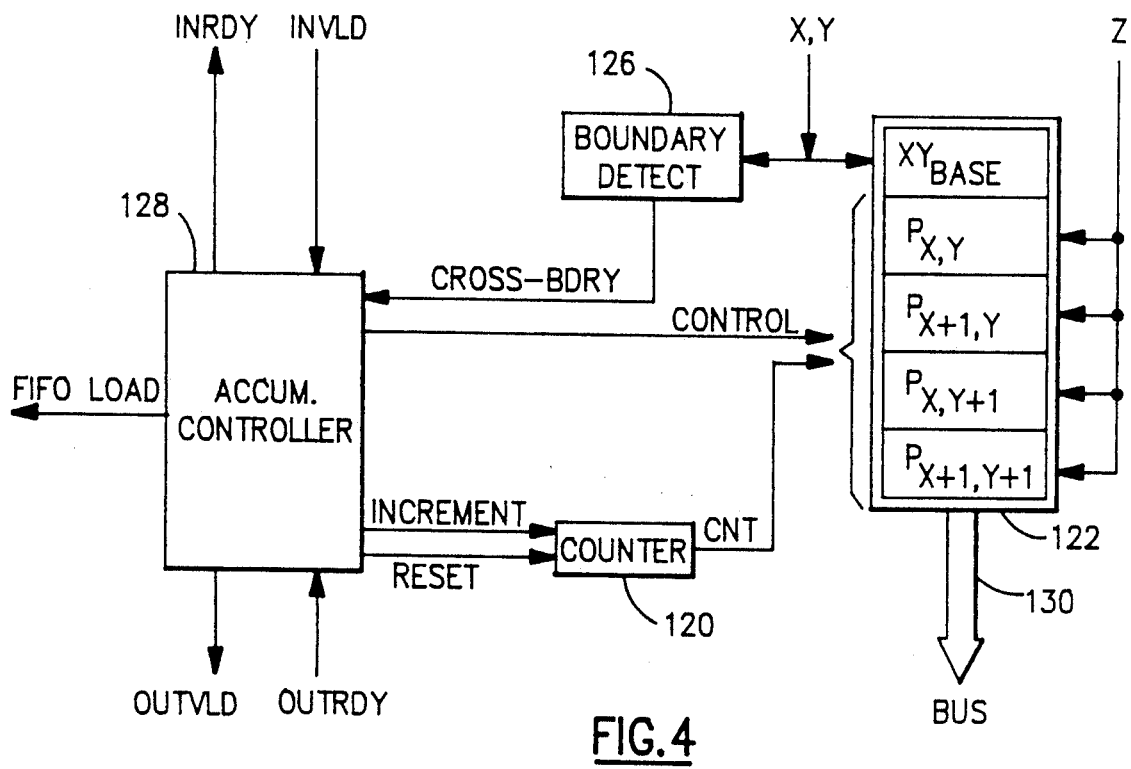
FIG. 4 is a block diagram showing detailed logic of an accumulator according to the present invention.
Figure 5A:
FIG. 5(a), 5(b), 5(c) illustrate the register structure employed in elements of the present invention.

A block diagram of accumulator 110 is presented in FIG. 4. Counter 120 is initially reset to an initial value When a valid pixel is received from the graphics processor, its X,Y components are examined and the Z coordinate loaded into an appropriate $p_{i,j}$ register and the coordinate of the lower left corner of the cell loaded into the $XY_{base}$. In the preferred embodiment only a single address, that of $XY_{base}$ is stored since each of the DRAM modules is accessed by a single address. The Z values, p, are compared to the respective modules, i.e. $p_{X,Y}$ to the first module, $pX+1Y$ to the second and so on. In an embodiment in which each module is independently addressable, the address for each pixel in the cell would need to be retained. Each of the registers 122 is the format as shown in FIG. 5a. The first field, Z, is the Z coordinate of the pixel being stored. Field L indicates that this is the last pixel for the cell to be loaded. V indicates the register is valid, and C is the value of counter 120 when this pixel is loaded.

Counter 120 is incremented after each pixel. By storing the counter in each pixel register, the order in which the pixels were generated can be recovered by serializer 116. When the END signal is transmitted by graphics processor or boundary detect 126 detects the crossing of a cell boundary, the field L is set in the current $p_{i,j}$ and the counter 120 reset to its initial value. The set of registers 122 are then passed to the memory controller 114 along bus 130. Controller 128 controls the process of loading the registers 122, passing RGB data to the FIFO queue, and communicating with the graphics processor and memory controller.

Figure 6:
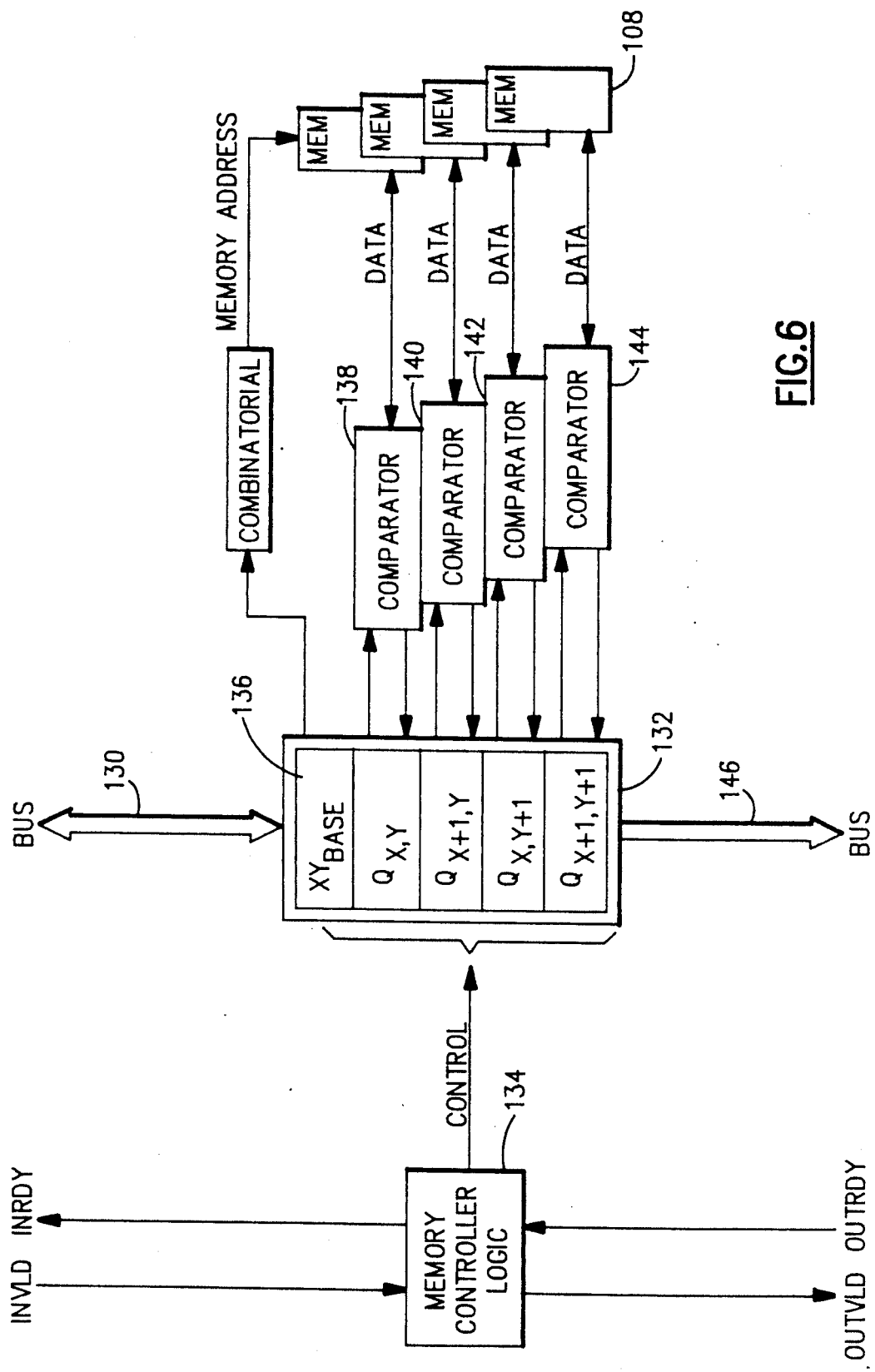
FIG. 6 is a block diagram of a memory controller according to the present invention.

Memory controller 114 is shown in greater detail in FIG. 6. The value stored in registers 122 by the accumulator are passed via bus 130 to registers 132 in the memory controller. The registers in the controller are arranged in an identical order with an $XY_{base}$ and values $q_{x,y}$ for each of the pixels. Under the control of memory controller logic 134, the register address $XY_{base}$ 136 is used to access DRAM modules 108. Data from DRAM modules 108 is passed along data lines to comparators 138, 140, 142, 144 which compare the ZOLD from memory 108 to the ZNEW values in the registers 132

Figure 5B:
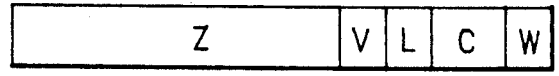

Each register $q_{i,j}$ has a format as shown in FIG. 5(b). The values Z, V, L, and C are equivalent to those of $p_{i,j}$. In addition, $q_{i,j}$ has the value W which is set according to the output of the respective comparator. For a particular pixel, if ZNEW<ZOLD and field V is true, then ZNEW is written to memory and field W is set true.

Once the comparison and update have been completed, memory controller logic transfers data from $q_{i,j}$ to the serializer along bus 146. Only the fields L, C, and W are transferred. The Z coordinate itself is no longer required.

Figure 5C:
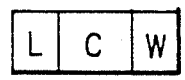
Figure 7:
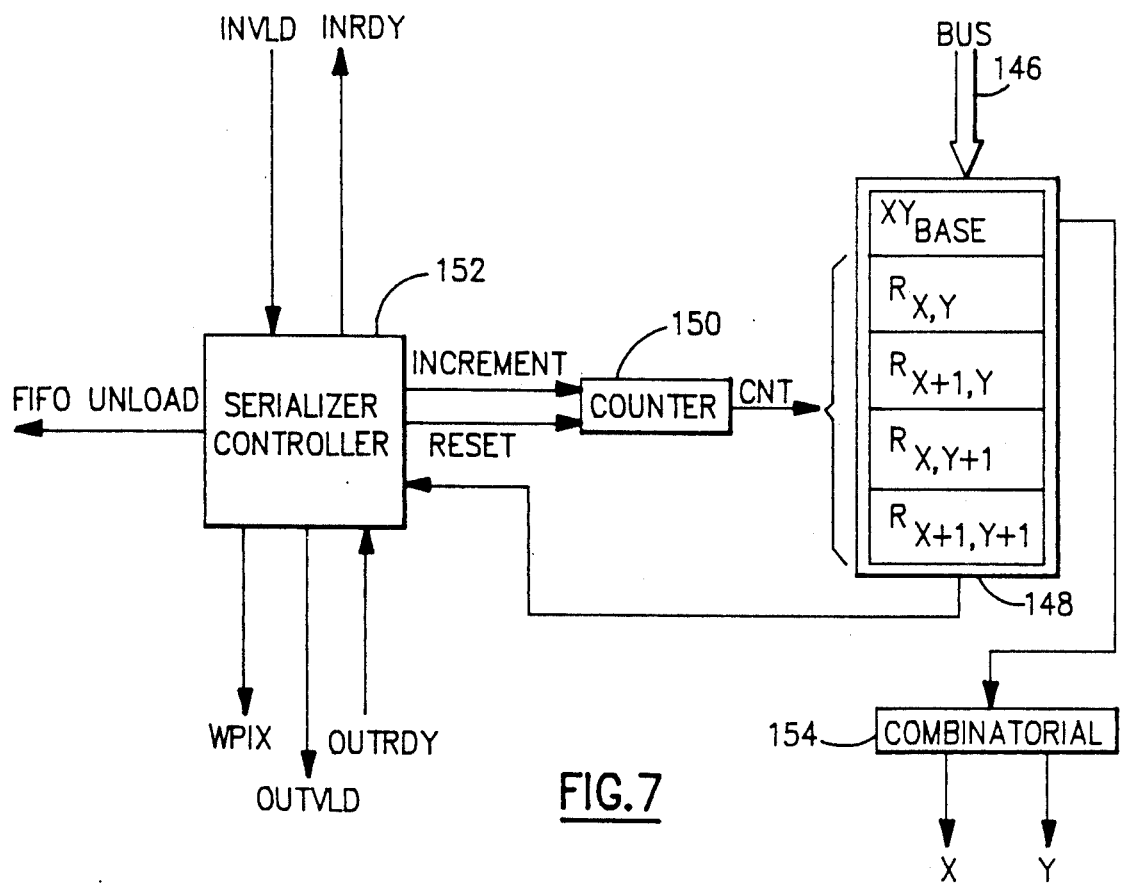
FIG. 7 is a block diagram of a serializer according to the present invention.

Serializer 116 is shown in greater detail in FIG. 7. The data from memory controller 114 is passed along bus 146 into registers 148. The format of the registers $r_{i,j}$ is shown in FIG. 5(c). The serializer 116 must serializer the $r_{i,j}$ into the order in which they were generated by the graphics processor and write them to the display interface if field W is true. Counter 150 is first set to an initialize value. Registers 148 act as an associative memory in the preferred embodiment with the output of counter 150 as the input register The matching $r_{i,j}$ value (the C field equal to counter 150) causes L and W to be passed to the serializer controller 152.

Combinatorial logic 154 computes an X and Y address for each step of the counter. If field W in $r_{i,j}$ is active, then X, Y, R, G, and B are placed on the display interface with WPIX having a true value. Otherwise, WPIX is inactive and the FIFO is simply unloaded In either case, the counter is incremented and the process repeated. If field L indicating the last pixel in the current cell, is true, then the counter is reset to its initial value.

The processing of accumulator, controller, and serializer occur concurrently in a pipeline fashion. That is, accumulator 110 can be loading the 3D pixels from a given cell n while memory controller 114 is comparing the Z coordinates from cell n−1 while serializer 116 is unloading two dimensional pixels from n−2. The high speed operation occurs because pixels are generated sequentially and written to the display sequentially but the access, compare, and update of the Z-buffer is performed in parallel.

It will be apparent to those skilled in the art that alternatives exist to the structure of the preferred embodiment. Among these alternatives, are the use of cell sizes or cell arrangements different from that described above. In addition, DRAM modules which are independently addressable in parallel may be employed. In that case, the actual address of each pixel would be stored and passed between the accumulator, memory controller, and serializer. In addition, different logic arrangements can be used to implement the accumulation, memory control, and serialization function. These and other alternate embodiments are considered to be within the scope of the presently described invention.

We claim:

1. A graphics display system for processing graphic orders and displaying objects on a display device, wherein said processing removes hidden surfaces, said system comprising:

graphic processor means for processing graphic orders and generating a plurality of picture elements each having a depth value, said processor means operating at a pixel generation rate;

memory means for storing a depth value for each picture element of said display device, said memory means having a pixel access rate;

accumulator means for accumulating a set of picture elements from said plurality of generated elements;

memory controller means for accessing a plurality of depth values in said memory means corresponding to said set of picture elements;

comparing means for comparing, in parallel, each of said picture elements with an associated depth buffer element; and serialization means for generating picture elements for display, said serialization means being responsive to said comparing means and generating a picture element only when said depth value of said generated picture element is nearer a set viewpoint than said depth value in said memory means.

2. The system of claim 1 wherein said pixel access rate is slower than said pixel generation rate.

3. A method for removing hidden surfaces in a graphics display system having a graphic processor for generating a plurality of pixels representing a graphics object, each pixel having a depth value representing a distance from a viewpoint, and a depth buffer having a stored depth value representing a previous pixel distance to said viewpoint for each pixel of a graphic display device, and wherein said pixels are generated at a first rate, and said memory means is accessed at a second rate, the method comprising the steps of:

defining a processing cell containing a fixed number of pixel elements;

accumulating generated pixels into said cell;

accessing said memory to return depth values for a plurality of pixels corresponding to said accumulated pixels comparing, in parallel, said generated depth value to said depth value in said memory; and generating serial pixels for each pixel for which the generated depth value is closer to said viewpoint than said stored depth value.

4. The method of claim 3 wherein said second generation rate is less than said first rate.

* * * * *